(12) United States Patent
Endres (10) Patent No.: US 12,202,058 B2
(45) Date of Patent: Jan. 21, 2025

(54) PERIPHERAL MILLING TOOL AND METHOD FOR ARRANGING CUTTING EDGES

(71) Applicant: Kennametal Inc., Latrobe, PA (US)

(72) Inventor: Frank Endres, Leinburg (DE)

(73) Assignee: KENNAMETAL INC., Latrobe, PA (US)

( * ) Notice: Subject to any disclaimer, the term of this patent is extended or adjusted under 35 U.S.C. 154(b) by 591 days.

(21) Appl. No.: 17/436,850

(22) PCT Filed: Feb. 28, 2020

(86) PCT No.: PCT/IB2020/051722
§ 371 (c)(1),
(2) Date: Sep. 7, 2021

(87) PCT Pub. No.: WO2020/178693
PCT Pub. Date: Sep. 10, 2020

(65) Prior Publication Data
US 2022/0176470 A1 Jun. 9, 2022

(30) Foreign Application Priority Data
Mar. 7, 2019 (DE) .......................... 102019105858.9

(51) Int. Cl.
*B23C 5/08* (2006.01)
*B23C 5/14* (2006.01)
*B23C 5/20* (2006.01)

(52) U.S. Cl.
CPC .................. *B23C 5/08* (2013.01); *B23C 5/14* (2013.01); *B23C 5/20* (2013.01); *B23C 2210/285* (2013.01); *B23C 2210/287* (2013.01)

(58) Field of Classification Search
CPC ........ B23C 2210/285; B23C 2210/287; B23C 2210/084; B23C 5/08; B23C 5/14; B23C 5/20
See application file for complete search history.

(56) References Cited

U.S. PATENT DOCUMENTS

| 3,584,361 A | 6/1971 | Erkfritz |
| 5,931,616 A | 8/1999 | Daub |

(Continued)

FOREIGN PATENT DOCUMENTS

| CH | 518144 | 1/1972 |
| CN | 102101193 A | 6/2011 |

(Continued)

OTHER PUBLICATIONS

English language translation of JP 2002-361511 (submitted in IDS). Application obtained from espacenet.com (Year: 2011).*
Sep. 23, 2023 Foreign Office Action Chinese Application No. CN20208018626, 17 Pages.
Jan. 10, 2023 Foreign Office Action Indian Application No. 202147038855, 6 Pages.

(Continued)

*Primary Examiner* — Moshe Wilensky
(74) *Attorney, Agent, or Firm* — Christopher J. Owens (57) ABSTRACT

A circumferential milling tool (10) for cutting metal is described, which comprises a milling cutter body (14) that can be rotated about a tool axis (12) and has at least two cutting edge groups. The arrangement of the first cutting edge group results in a first average chip thickness for the cutting edges (16) of the first cutting edge group and a second average chip thickness for the cutting edges (18, 20, 22, 24, 26) of the second cutting edge group. The first average chip thickness and the second average chip thickness are substantially equal. A method for arranging cutting edges (16, 18, 20, 22, 24, 26) on a circumferential milling tool (10) that can be rotated about a tool axis (12) is presented as well.

14 Claims, 4 Drawing Sheets

(56) References Cited

U.S. PATENT DOCUMENTS

| | | |
|---|---|---|
| 8,821,080 B2 | 9/2014 | Festeau et al. |
| 2001/0002972 A1 | 6/2001 | Satran et al. |
| 2005/0117981 A1 | 6/2005 | Satran et al. |
| 2006/0002779 A1 | 1/2006 | Bauer et al. |
| 2011/0150583 A1 | 6/2011 | Engstrom |
| 2011/0150584 A1 | 6/2011 | Hakamada |
| 2013/0115021 A1 | 5/2013 | Festeau et al. |

FOREIGN PATENT DOCUMENTS

| | | |
|---|---|---|
| DE | 7905116 | 6/1979 |
| DE | 102016104005 A1 | 9/2017 |
| DE | 202018003189 U1 | 9/2018 |
| EP | 0355305 | 2/1993 |
| GB | 984848 | 3/1965 |
| GB | 1354829 | 6/1974 |
| JP | 2002-361511 A | 12/2002 |
| JP | 2004-223630 A | 8/2004 |
| JP | 2015196203 A | 11/2015 |

OTHER PUBLICATIONS

European Office Communication for Application No. 20765645.5, mailed on Nov. 15, 2022, 2 pages.
Feb. 3, 2024 Foreign Office Action Chinese Application No. CN202080018626.9, 17 Pages.
Oct. 14, 2021 EPO Notification R161(1) & R.162 Ep App. No. 20765645.5.
International Search Report and Written Opinion corresponding to PCT/IB2020/051722, mailed Jun. 30, 2020, 14 pages.
Apr. 13, 2023 Foreign Office Action Chinese Application No. CN20208018626, 21 Pages.
May 30, 2023 Foreign Office Action for European Application No. EP20765645.5, 2 Pages.
Extended European Search Report for European Application No. 20765645.5, mailed Oct. 28, 2022, 26 pages.
International Preliminary Report on Patentability for International Application No. PCT/IB2020/051722, mailed Sep. 16, 2021, 9 Pages.

\* cited by examiner

PERIPHERAL MILLING TOOL AND METHOD FOR ARRANGING CUTTING EDGES

The present application is a U.S. National Phase of PCT/IB2020/051722, filed Feb. 28, 2020, which claims priority to German patent application number 102019105858.9, filed Mar. 7, 2019, each of which are incorporated herein by reference in their entireties.

The invention relates to a circumferential milling tool for cutting metal, comprising a milling cutter body that can be rotated about a tool axis, on which at least two cutting edge groups are arranged, wherein the cutting edges of a first cutting edge group are arranged on a circular path which has a first diameter and extends around the tool axis and the cutting edges of a second cutting edge group are arranged on a circular path which has a second diameter and extends around the tool axis.

The invention further relates to a method for arranging cutting edges on a circumferential milling tool that can be rotated about a tool axis.

circumferential milling tools having two or more cutting edge groups are known from the state of the art. In such circumferential milling tools, the cutting edges are arranged using an aforementioned method.

The arrangement of the cutting edge groups affects not only the milling process implemented using the corresponding cutting edges but also the load on the circumferential milling tool. As far as the milling process is concerned, the arrangement of the cutting edge groups should be selected such that a high metal removal rate can be achieved, i.e. the milling process runs efficiently. At the same time, a high surface quality of the machined surfaces should be ensured. The service life of the individual cutting edges should also be high. Meanwhile the circumferential milling tool should be loaded as little as possible and, in particular, evenly. There are obviously a number of conflicting objectives here.

The object of the invention is therefore to specify a circumferential milling tool in which the aforementioned conflicting objectives are resolved or at least greatly reduced in intensity. The intent is in particular to ensure economical component machining using a circumferential milling tool to be specified.

The object is achieved by a circumferential milling tool of the aforementioned type, in which the cutting edges of the first cutting edge group are arranged at a first setting angle and the cutting edges of the first cutting edge group are assigned a first average chip thickness for a predetermined first tooth feed and a predetermined first cutting width and the cutting edges of the second cutting edge group are arranged on the milling cutter body at a second setting angle such that they are assigned a second tooth feed and a second cutting width which result from the predetermined first tooth feed and the predetermined first cutting width and which in turn result in a second average chip thickness that is assigned to the cutting edges of the second cutting edge group, whereby the first average chip thickness and the second average chip thickness are substantially equal. The feed rate is the feed path per revolution of the milling cutter. The tooth feed ($f_z$) is thus the feed path per tooth or cutting edge. The cutting width ($A_e$) is also referred to as the working width. It describes the width over which the circumferential milling tool is in engagement with a workpiece. It is always measured in the working plane, whereby the working plane is defined by the feed direction and the cutting direction. The predetermined tooth feed and the predetermined cutting width (usually abbreviated to $A_p$) can be adjusted as needed.

The setting angle ($\kappa$), which is also referred to as the tool setting angle, is the angle between the working plane and the tool cutting plane. It therefore determines the position of the main cutting edge in relation to the workpiece. As is known, the chip thickness changes over the course of the cutting engagement of a circumferential milling tool. The average chip thickness can be specified via the following formula, wherein d is the tool diameter.

$$h_m = \sin\kappa * \frac{114,6}{\arccos\left(1 - \frac{2*A_e}{d}\right)} * f_z * \frac{A_e}{d}$$

There are also various approximation formulas for the formula for the average chip thickness. One example of an approximation formula is the following:

$$h_m = \sin\kappa * f_z * \sqrt{\frac{A_e}{d}}$$

In both formulas, the tooth feed ($f_z$), i.e. the feed path per tooth, is calculated using the following formula, whereby f is the feed rate per revolution and $Z_{eff}$ is the effective number of teeth:

$$f_z = \frac{f}{Z_{eff}}$$

A modified tooth feed can thus result from a change in one of the input variables of the aforementioned formula, in particular the effective number of teeth.

This results in a circumferential milling tool, the cutting edges of which are loaded substantially uniformly. This results in a relatively low load on the tool. At the same time, an efficient and effective milling process with a high metal removal rate is made possible.

The first diameter of the circular path on which the cutting edges of the first cutting edge group are arranged and the second diameter of the circular path, on which the cutting edges of the second cutting edge group are arranged, can be the same or different.

The basic idea of the present invention is to view the average chip thickness as a measure of the load on the individual cutting edges, and to design the circumferential milling tool such that the average chip thickness is the same or approximately the same across all cutting edge groups. It is therefore a matter of loading all cutting edges substantially equally. If this basic idea is based on a circumferential milling tool having only one cutting edge group, then the cutting edges of the second cutting edge group can also be regarded as relief cutting edges for the first cutting edge group.

In the present case, every cutting edge group beyond a first cutting edge group should be considered to be a second cutting edge group.

In known circumferential milling tools, different average chip thicknesses can result from different setting angles of a cutting edge, for example a cutting edge having a round cutting edge profile. Different average chip thicknesses can also occur if different cutting edges are arranged at different setting angles. This can also occur if different cutting edge groups are arranged on different diameters. This creates a different cutting width. A different cutting width can also result if the allowances on the workpiece to be machined are inconsistent. A different tooth feed, which in turn affects the average chip thickness, can also result from a different effective number of teeth. All of these effects, which are typically perceived as disruptive, are used within the scope of the present invention to set an average chip thickness on the circumferential milling tool that is as equal as possible across all cutting edge groups.

The cutting edges of the first cutting edge group are preferably offset along the tool axis relative to the cutting edges of the second cutting edge group. The individual cutting edge groups are thus offset in axial direction.

In one variant, cutting edges of a third cutting edge group are provided, which are arranged on a circular path which has a third diameter and extends around the tool axis, and which are arranged on the milling cutter body at a third setting angle such that they are assigned a third tooth feed and a third cutting width which result from the predetermined first tooth feed and the predetermined first cutting width and which in turn result in a third average chip thickness that is assigned to the cutting edges of the third cutting edge group, whereby the third average chip thickness is substantially equal to the first average chip thickness and/or the second average chip thickness. A circumferential milling tool is thus produced according to the above explanations, which is loaded substantially uniformly during the milling process. The effects and advantages described with regard to the circumferential milling tool having two cutting edge groups apply accordingly. A milling tool having three cutting edge groups makes a particularly efficient milling process possible, because the three cutting edge groups either ensure a high metal removal rate, or a predetermined contour or a predetermined profile can largely be produced directly, i.e. using a single milling operation. The service life of the individual cutting edges can furthermore be increased with such a circumferential milling tool.

The third diameter can be equal or unequal to the first and/or second diameter.

The cutting edges are preferably cutting edges of cutting inserts, in particular indexable inserts, arranged on the milling cutter body. In such circumferential milling tools, the cutting edges can easily be replaced, for example if they are no longer usable due to wear. Such circumferential milling tools are particularly economical to use.

According to one embodiment, the first average chip thickness and/or the second average chip thickness and/or the third average chip thickness, differ by at most 10%, preferably by at most 5%, further preferably by at most 2%. This means that, of the respectively compared average chip thicknesses, one is at most 10%, preferably at most 5%, more preferably at most 2% larger or smaller than the respective other one. The resulting average chip thicknesses are thus substantially equal. This results in the effects and advantages already mentioned.

The circumferential milling tool can be a side milling cutter, a slotting cutter, a profile cutter, an angular milling cutter or a face milling cutter. A profile cutter can, for example, be configured to produce so-called fir-tree grooves.

The term "circumferential milling tool" is thus broadly defined. It includes all milling tools in which a tool periphery, which is defined relative to the tool axis, is involved in a milling operation. The term "circumference" thus refers to the tool and not to the workpiece to be machined.

In one variant, the cutting edges of the first cutting edge group and/or the second cutting edge group and/or the third cutting edge group are arc-shaped, in particular circular arc-shaped. This can in particular be achieved with indexable inserts that are round or have round sections.

It is also possible for the setting angles of the cutting edges of different cutting edge groups to be different. As has already been explained, the use of different setting angles is a simple way to equalize the average chip thicknesses of the cutting edge groups.

The setting angle of the arc-shaped cutting edges of different cutting edge groups can adjoin one another with or without overlapping. For example, the cutting edges of a first cutting edge group can have a setting angle of 90° to 30°. This can be achieved with cutting edges that are round or have round sections. The cutting edges of a second cutting edge group can have a setting angle of 45° to 0°. The cutting edges of the second cutting edge group are also round, for example.

The different cutting edge groups advantageously comprise different numbers of cutting edges. The tooth feed can be influenced via the number of cutting edges, for example, and the average chip thickness can be varied. In this way, the average chip thicknesses of different cutting edge groups can be matched to one another.

The cutting edges of at least one, preferably all cutting edge groups, are furthermore preferably distributed evenly around the circumference. This means that there is an identical circumferential distance between the cutting edges of a cutting group. A circumferential milling tool is thus created, which is loaded particularly uniformly when it is involved in a milling operation.

The object is also achieved by a method of the aforementioned type, which comprises the following steps:
a) arranging cutting edges of a first cutting edge group on a circular path which has a first diameter and extends around the tool axis and each with a first setting angle, so that, at a predetermined rotational speed of the circumferential milling tool and a predetermined feed rate of the circumferential milling tool, a first cutting width and a first tooth feed for the cutting edges of the first cutting edge group are set, which result in a first average chip thickness that is assigned to the cutting edges of the first cutting edge group,
b) arranging cutting edges of a second cutting edge group on a circular path which has a second diameter and extends around the tool axis and each with a second setting angle, wherein the second diameter and/or the second setting angle are selected such that, at the predetermined rotational speed of the circumferential milling tool and the predetermined feed rate of the circumferential milling tool, a second cutting width and a second tooth feed for the cutting edges of the second cutting edge group are set, which result in a second average chip thickness that is assigned to the cutting edges of a second cutting edge group, and the second average chip thickness and the first average chip thickness are substantially equal.

Therefore, with this method, a circumferential milling tool can be created, that is uniformly loaded in a special manner during operation. This makes it possible to achieve the advantages and effects already described for the circumferential milling tool according to the invention. The aforementioned conflicting objectives are resolved or at least mitigated.

The method can be used for circumferential milling tools in which the first diameter and the second diameter are the same or different.

The method is obviously not limited to two cutting edge groups. For each further cutting edge group, for example for a third cutting edge group, the procedure is analogous to Step b).

According to one variant, the first average chip thickness and the second average chip thickness are selected such that they differ by at most 10%, preferably by at most 5%, further preferably by at most 2%. A substantially uniformly loaded circumferential milling tool is thus created.

This can be achieved by the fact that the different cutting edge groups comprise different numbers of cutting edges. This results in the effects and advantages already described.

The cutting edges of at least one, preferably all cutting edge groups, are advantageously distributed evenly around the circumference. This results in a uniform load on the circumferential milling tool.

The invention is explained below with the aid of different design examples, which are shown in the accompanying drawings. The drawings show:

FIGS. 1 to 6 show a circumferential milling tool 10 that is configured as a side milling cutter. Said tool is intended to produce grooves, in particular so-called fir-tree grooves 11 (see FIG. 4).

Figure 1:
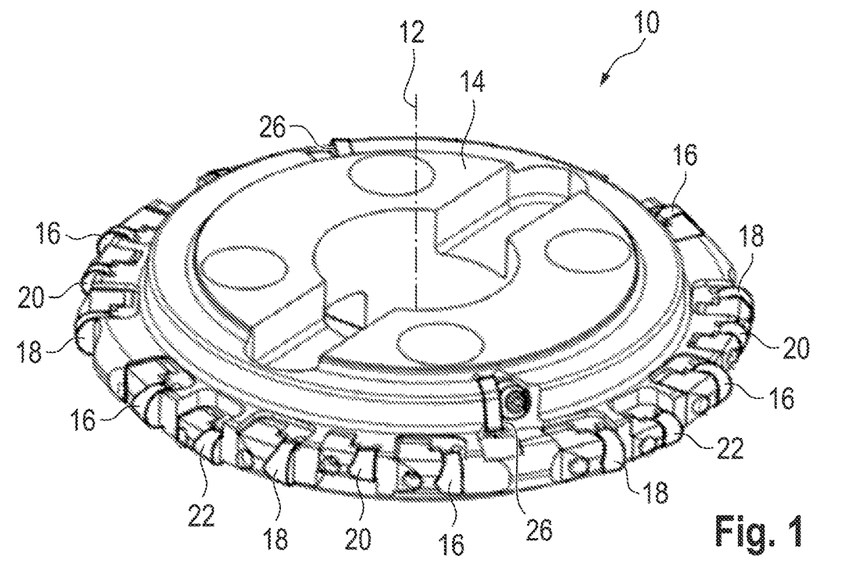
FIG. 1 in a perspective view, a circumferential milling tool according to the invention in a first embodiment, the cutting edges of which are arranged using a method according to the invention, FIG. 2 the circumferential milling tool of FIG. 1 in a plan view, FIG. 3 the circumferential milling tool of FIG. 2 in a sectional view along the line III-III, FIG. 4 a detail IV of the circumferential milling tool of FIG. 3, wherein a fir-tree groove produced by means of the circumferential milling tool is also shown schematically, FIG. 5 a sketch that serves to explain FIG. 4 in more detail, FIG. 6 a sketch that serves to explain FIG. 4 in more detail, FIG. 7 in a plan view, a circumferential milling tool according to the invention in a second embodiment, the cutting edges of which are arranged using a method according to the invention, FIG. 8 a broken sectional view along the line VIII-VIII of the circumferential milling tool of FIG. 7, FIG. 9 a detail IX of the circumferential milling tool of FIG. 8, FIG. 10 in a lateral view, a circumferential milling tool according to the invention in a third embodiment, the cutting edges of which are arranged using a method according to the invention, and FIG. 11 an example of a workpiece contour produced by means of the circumferential milling tool of FIG. 10, whereby an associated starting contour is shown as well.

The circumferential milling tool 10 comprises a milling cutter body 14 that can be rotated about a tool axis 12.

It comprises a total of six cutting edge groups, which are described below in particular with reference to FIG. 4. The cutting edges of all six cutting edge groups are formed by indexable inserts arranged on the milling cutter body 14.

A first cutting edge group comprises the cutting edges 16, each of which has a circular shape. The cutting edges 16 can be referred to as main cutting edges.

A second cutting edge group is formed by the cutting edges 18. They also have a circular shape. The cutting edges 18 can also be referred to as main cutting edges.

Both the cutting edges 16 of the first cutting edge group and the cutting edges 18 of the second cutting edge group are arranged on a circular path having the same diameters. However, the cutting edges 16 of the first cutting edge group are preferably offset along the tool axis relative to the cutting edges 18 of the second cutting edge group.

A third cutting edge group, that comprises the cutting edges 20, is provided as well. These are circular. The cutting edges 20 can be referred to as relief cutting edges, whereby they in particular relieve the load on the cutting edges 16.

Furthermore, a fourth cutting edge group, that comprises the cutting edges 22, is provided. These, too, are circular. The cutting edges 22 of the fourth cutting edge group can be referred to as relief cutting edges. They in particular relieve the load on the cutting edges 18.

Compared to the first and second cutting edge groups, the cutting edges 20, 22 of the third and fourth cutting edge groups are arranged on a somewhat smaller diameter. The diameters of the third and fourth cutting edge groups are the same.

Figure 5:
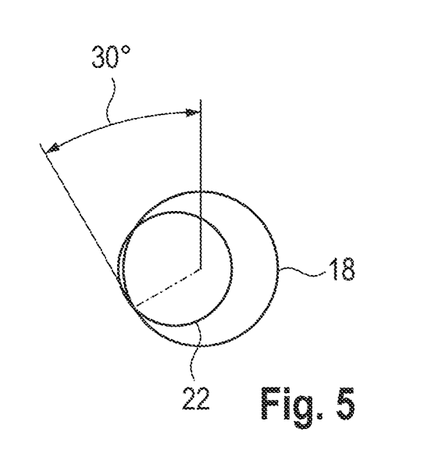
Figure 6:
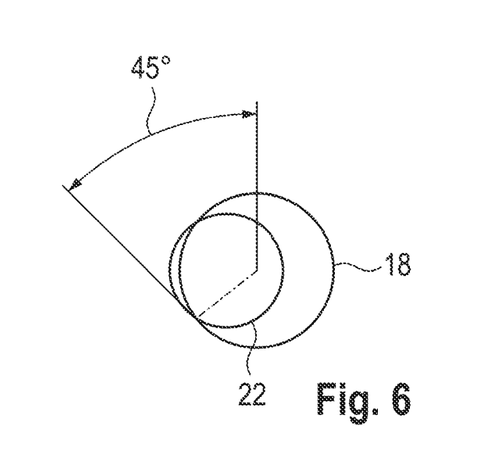

The relative arrangement of the cutting edges 18 and the cutting edges 22 is shown in detail in FIGS. 5 and 6.

From this it can be seen that the effective setting angle κ of the cutting edges 18 ranges only from 90° to 30°. This directly influences an assigned average chip thickness.

As can be seen in FIG. 6, the setting angle κ of the cutting edges 22 starts at 45° and goes down to 0°.

The setting angles κ of the cutting edges 18 and 22 are therefore different and adjoin one another with overlapping. The overlapping range extends from 30° to 45°. The same applies to the cutting edges 16 in relation to the cutting edges 20.

Figure 4:
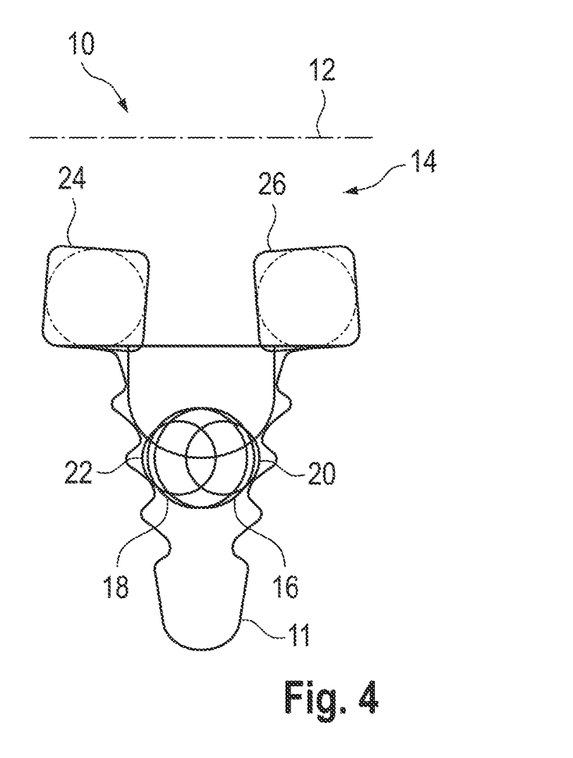

In order to produce the upper contour of the fir-tree groove 11 shown in FIG. 4, a fifth cutting edge group with cutting edges 24 and a sixth cutting edge group with cutting edges 26 are provided as well. In the embodiment shown, the cutting edges 24 and 26 are provided by indexable inserts having a substantially rectangular shape.

The following table shows the average chip thicknesses achieved with the first to sixth cutting edge group $h_m$. The calculation is carried out using the diameter d assigned to the respective cutting edge group, the number of teeth Z, the setting angle κ, the cutting width $A_e$ and the tooth feed $f_z$. The aforementioned formula is used

| | First cutting edge group | Second cutting edge group | Third cutting edge group | Fourth cutting edge group | Fifth cutting edge group | Sixth cutting edge group |
|---|---|---|---|---|---|---|
| d [mm] | 200 | 200 | 188.2 | 188.2 | 159 | 159 |
| Z [−] | 6 | 6 | 4 | 4 | 2 | 2 |
| κ [°] | 90 | 90 | 45 | 45 | 85 | 85 |
| $A_e$ [mm] | 6.1 | 6.1 | 5.0 | 5.0 | 0.5 | 0.5 |
| $f_z$ [mm] | 0.17 | 0.17 | 0.26 | 0.26 | 0.51 | 0.51 |
| $h_m$ [mm] | 0.030 | 0.030 | 0.029 | 0.029 | 0.028 | 0.028 |

The table further shows that the different cutting edge groups comprise different numbers of cutting edges 16, 18, 20, 22, 24, 26.

Figure 2:
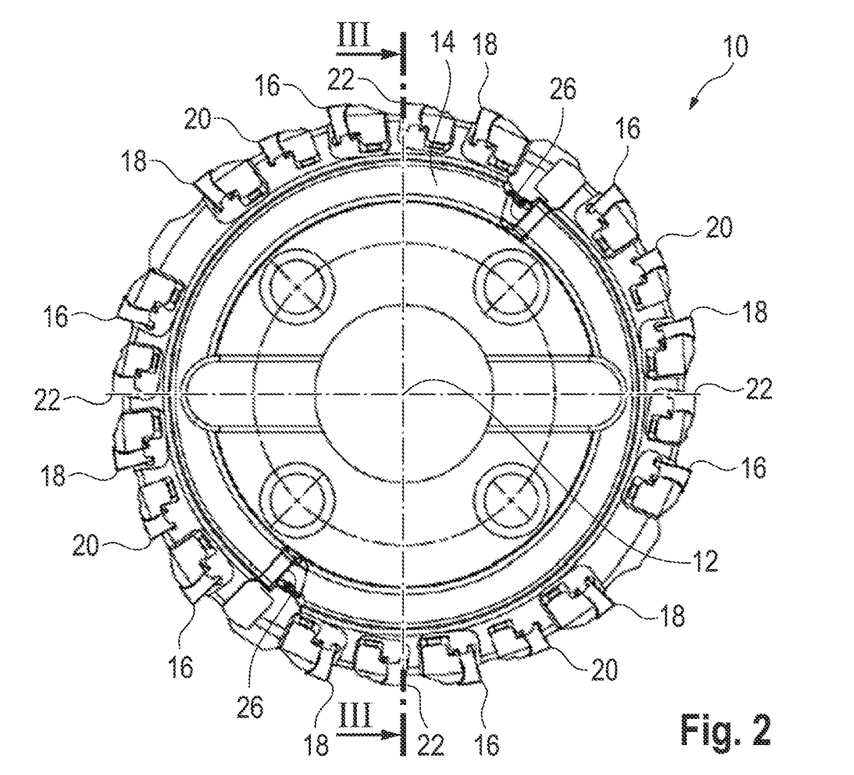
Figure 3:
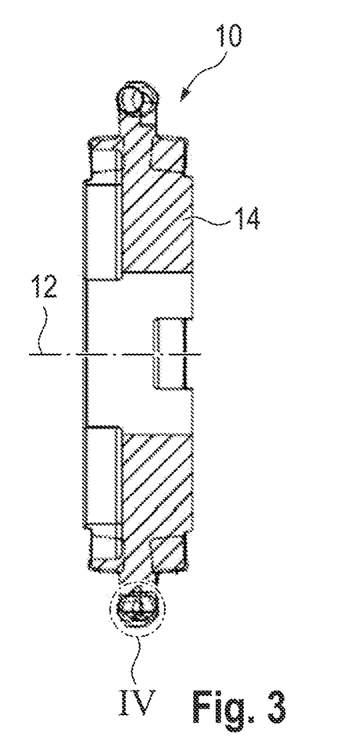

The individual cutting edges 16, 18, 20, 22, 24, 26 are distributed substantially evenly around the circumference of the milling cutter body 14 (see FIGS. 1 and 2).

In the circumferential milling tool 10 according to the first embodiment, an angular distance of 15° between adjacent cutting edges 16, 18, 20, 22, 24, 26 is always maintained, regardless of affiliation to one of the cutting edge groups. The altogether 24 cutting edges 16, 18, 20, 22, 24, 26 are thus evenly distributed around the circumference of the milling cutter body 14.

36 cutting edge stations can alternatively be provided as well. With a total of 36 cutting edge stations, a so-called 9-part division can start at 0°, 10° and 20° respectively. Starting from a 0° position, nine cutting edge stations are thus distributed evenly around the circumference of the milling cutter body 14. The same procedure is used for the start position 10° and 20°. A so-called 3-part division starts at the positions at 30°, 70°, and 110°. Starting from these starting positions, three cutting edge stations are thus respectively distributed evenly around the circumference of the milling cutter body 14. With this arrangement of the cutting edge stations, adjacent cutting edges are always offset by 10°.

In another variant with 36 cutting edge stations, a 9-part division can start at 0° and at 20° respectively, and a 6-part division can start at 10°, 30° and 50° respectively.

In an additional alternative having 36 cutting edge stations, 6-part divisions can start at 0°, 20°, 30° and 50°, and 4-part divisions can start at 10°, 10° [sic] and 70° respectively.

If, alternatively, only 20 cutting edge stations are provided, 5-part divisions can start at 0° and 36° and 2-part divisions can start at 18°, 54°, 90°, 126° and 162° respectively.

The table also shows that the given average chip thicknesses $h_m$ of the individual cutting edge groups are substantially equal.

Figure 7:
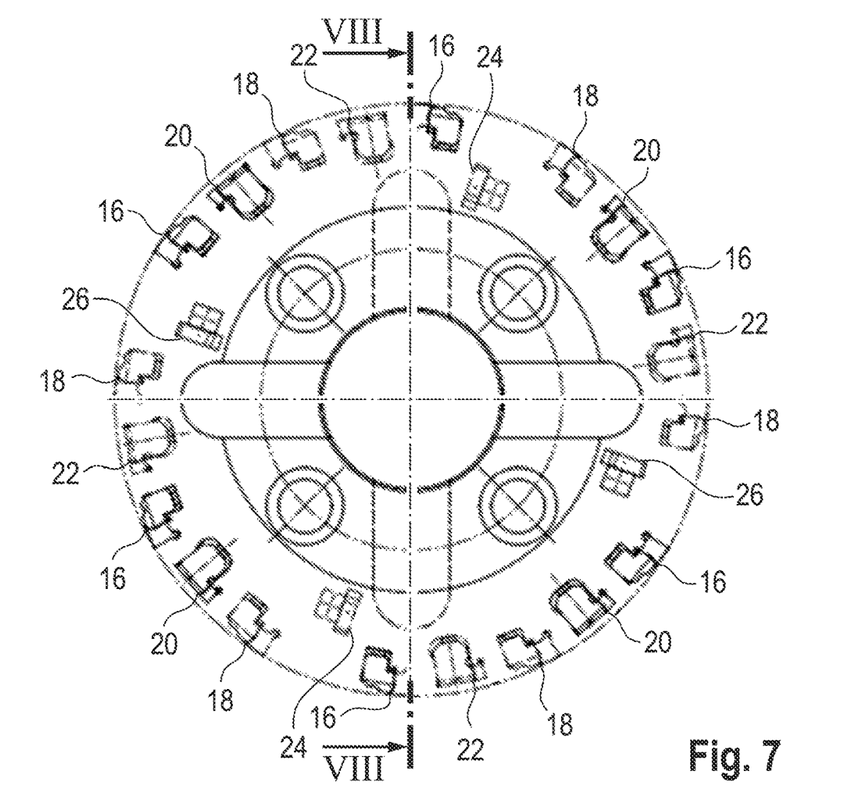
Figure 8:
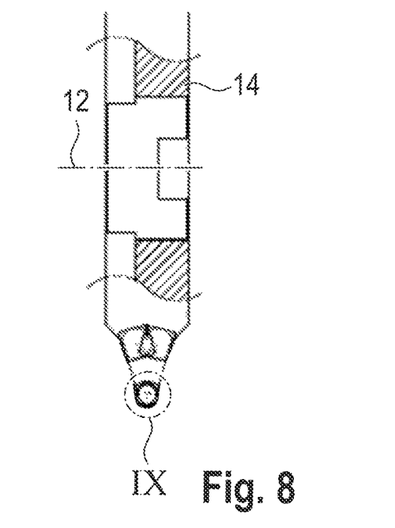
Figure 9:
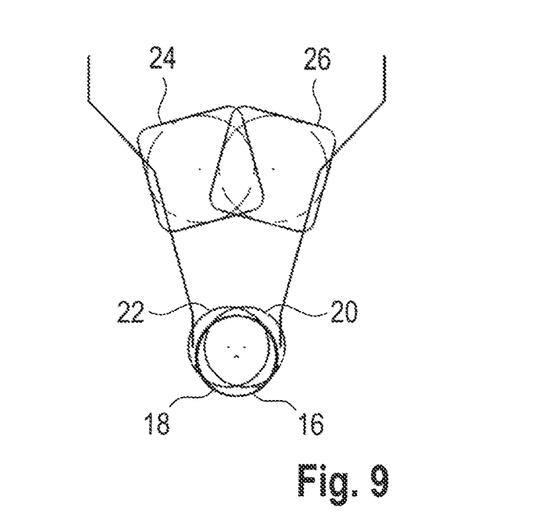

A further, second embodiment of the circumferential milling tool 10 is shown in FIGS. 7 to 9. This embodiment again differs from the two aforementioned embodiments only by the values given in the following table. Otherwise, we refer to the explanations above.

|  | First cutting edge group | Second cutting edge group | Third cutting edge group | Fourth cutting edge group | Fifth cutting edge group | Sixth cutting edge group |
| --- | --- | --- | --- | --- | --- | --- |
| d [mm] | 200 | 200 | 197.8 | 197.8 | 153.3 | 153.3 |
| Z [-] | 6 | 6 | 4 | 4 | 2 | 2 |

Figures 10, 11:
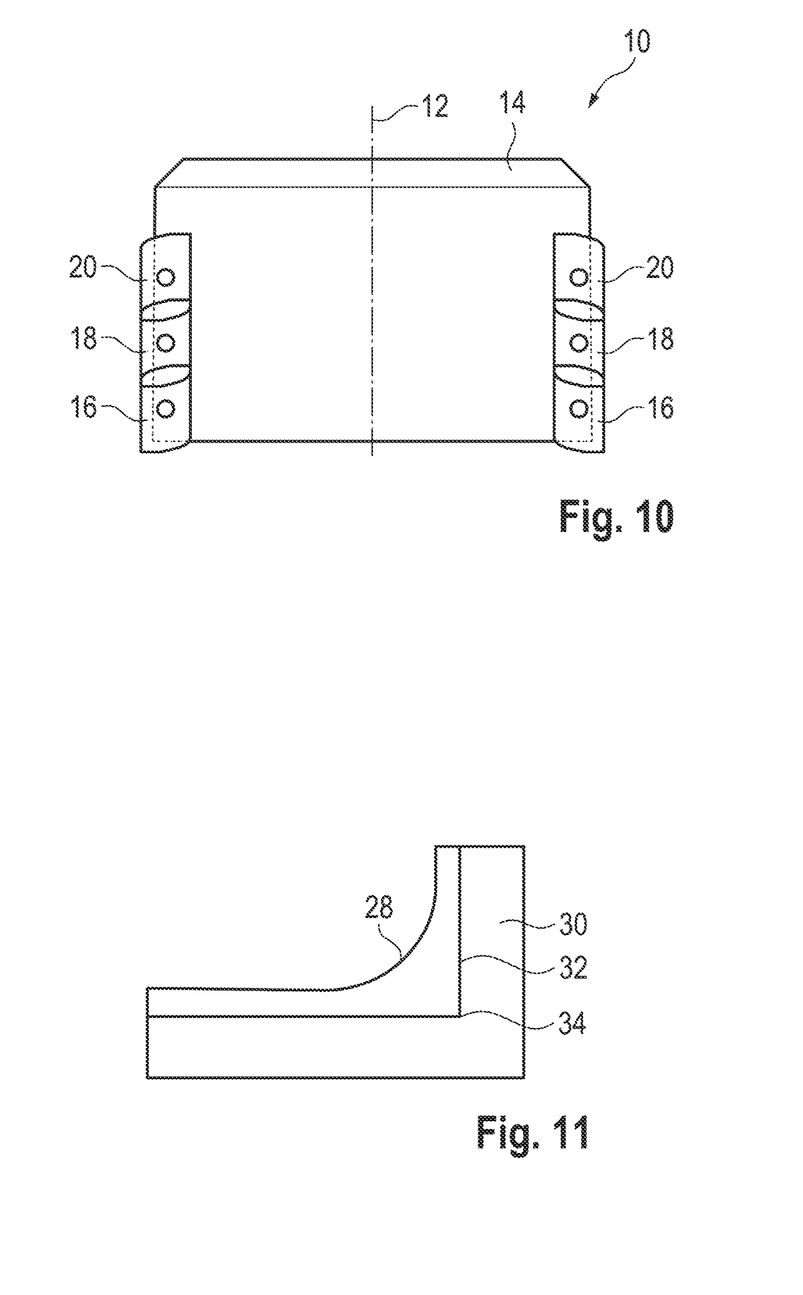

A third embodiment is shown in FIGS. 10 and 11. Here the circumferential milling tool 10 is configured as a face milling cutter.

It comprises only three cutting edge groups. These are again formed by indexable inserts, whereby the cutting edges are designated with the reference signs 16, 18, 20 of the cutting edges of the first three cutting edge groups from the aforementioned design examples.

In contrast to the aforementioned embodiments, the diameters on which the cutting edges 16, 18, 20 belonging to the different cutting edge groups are arranged are now the same. The cutting edges 16, 18, 20 and the indexable inserts of the individual cutting edge groups carrying them are offset from one another only along the tool axis 12.

The exact characteristic values of the circumferential milling tool 10 according to the third embodiment are shown in the following table:

|  | First cutting edge group | Second cutting edge group | Third cutting edge group |
| --- | --- | --- | --- |
| d [mm] | 63 | 63 | 63 |
| Z [—] | 12 | 6 | 4 |
| K [°] | 90 | 90 | 90 |

-continued

|  | First cutting edge group | Second cutting edge group | Third cutting edge group |
| --- | --- | --- | --- |
| $A_e$ [mm] | 50 | 8.7 | 4.0 |
| $f_z$ [mm] | 0.22 | 0.44 | 0.66 |
| $h_m$ [mm] | 0.159 | 0.160 | 0.165 |

It can be seen that the specified average chip thicknesses $h_m$ are substantially equal.

With a circumferential milling tool according to the third embodiment, casting radii 28 of a cast component 30, for example, which is only shown schematically, can be removed (see FIG. 11). In this way, a final contour 32 with a precisely extending corner edge 34 can be produced.

In all embodiments, the cutting edges are arranged on a circumferential milling tool 10 that can be rotated about a tool axis 12 with the aid of a method for arranging cutting edges 16, 18, 20, 22, 24, 26. The following procedure is used:

First, the cutting edges 16 of the first cutting edge group are arranged on a circular path, which has a first diameter $d_1$ and extends around the tool axis 12. The cutting edges 16 are respectively positioned at a first setting angle $\kappa_1$, so that, at a predetermined rotational speed and a predetermined feed rate of the circumferential milling tool 10, a first cutting width $A_{e1}$ and a first tooth feed $f_{z1}$ for the cutting edges 16 of the first cutting edge group are set. This results in a first average chip thickness $h_{m1}$, which is assigned to the cutting edges 16 of the first cutting edge group.

A second cutting edge group is then arranged on a circular path, which has a second diameter $d_2$ and extends around the tool axis 12. In the sense of the method described here, each cutting edge group that is additional to the first cutting edge group is referred to as a second cutting edge group.

As can be seen from the above design examples, the second diameter $d_2$ can be the same as or different than the first diameter $d_1$.

The cutting edges 18, 20, 22, 24, 26 belonging to the second cutting edge group are respectively arranged at a second setting angle $\kappa_2$.

The second diameter $d_2$ and/or the second setting angle $\kappa_2$ are selected such that, at the predetermined rotational speed and the predetermined feed rate of the circumferential milling tool 10, a second cutting width $A_{e2}$ and a second tooth feed $f_{z2}$ for the cutting edges 18, 20, 22, 24, 26 of the second cutting edge group are set.

It is also possible to vary the number of cutting edges 16, 18, 20, 22, 24, 26 of a cutting edge group as an additional influencing variable.

This results in a second average chip thickness $h_{m2}$ for the second cutting edge group, which is assigned to the cutting edges 18, 20, 22, 24, 26 of the second cutting edge group.

The second average chip thickness $h_{m2}$ is set via the mentioned influencing factors in such a way that it is substantially equal to the first average chip thickness $h_{m1}$.

As already discussed, this means that the first average chip thickness $h_{m1}$ and the second average chip thickness $h_{m2}$ differ from one another by at most 10%, preferably by at most 5%, further preferably by at most 2%.

The cutting edges 16, 18, 20, 22, 24, 26 of the individual cutting edge groups are preferably distributed evenly around the circumference.

The invention claimed is:

1. A circumferential milling tool for cutting metal, comprising a milling cutter body that is rotated about a tool axis, on which at least three cutting edge groups are arranged,
    wherein the cutting edges of a first cutting edge group are arranged on a circular path which has a first diameter ($d_1$) and extends around the tool axis and the cutting edges of a second cutting edge group are arranged on a circular path which has a second diameter ($d_2$) and extends around the tool axis, wherein the cutting edges of the first cutting edge group are arranged at a first setting angle ($\kappa_1$) and the cutting edges of the first cutting edge group are assigned a first average chip thickness ($h_{m1}$) for a predetermined first tooth feed ($f_{z1}$) and a predetermined first cutting width ($A_{e1}$),
    wherein the cutting edges of the second cutting edge group are arranged on the milling cutter body at a second setting angle ($\kappa_2$) such that they are assigned a second tooth feed ($f_{z2}$) and a second cutting width ($A_{e2}$) which result from the predetermined first tooth feed ($f_{z1}$) and the predetermined first cutting width ($A_{e1}$) and which in turn result in a second average chip thickness ($h_{m2}$) that is assigned to the cutting edges of the second cutting edge group, wherein the first average chip thickness ($h_{m1}$) and the second average chip thickness ($h_{m2}$) differ by at most 10%,
    wherein cutting edges of a third cutting edge group are provided, which are arranged on a circular path which has a third diameter ($d_3$) and extends around the tool axis, and which are arranged on the milling cutter body at a third setting angle ($\kappa_3$) such that they are assigned a third tooth feed ($f_{z3}$) and a third cutting width ($A_{e3}$) which result from the predetermined first tooth feed ($f_{z1}$) and the predetermined first cutting width ($A_{e1}$) and which in turn result in a third average chip thickness ($h_{m3}$) that is assigned to the cutting edges of the third cutting edge group, wherein the third average chip thickness ($h_{m3}$) differ by at most 10% with respect to the first average chip thickness ($h_{m1}$) and/or the second average chip thickness ($h_{m2}$),
    wherein the cutting edges of the first cutting edge group are offset along the tool axis relative to the cutting edge of the second cutting edge group, and
    wherein the third diameter ($d_3$) is smaller than the first diameter ($d_1$) and the second diameter ($d_2$).

2. The circumferential milling tool according to claim 1, wherein the cutting edges are cutting edges of indexable cutting inserts arranged on the milling cutter body.

3. The circumferential milling tool according to claim 1, wherein the first average chip thickness ($h_{m1}$) and/or the second average chip thickness ($h_{m2}$) and/or the third average chip thickness ($h_{m3}$) are equal.

4. The circumferential milling tool according to claim 1, wherein the circumferential milling tool is a side milling cutter, a slotting cutter, a profile cutter, an angular milling cutter or a face milling cutter.

5. The circumferential milling tool according to claim 1, wherein the cutting edges of the first cutting edge group and/or the second cutting edge group and/or the third cutting edge group are circular arc-shaped.

6. The circumferential milling tool according to claim 1, wherein the setting angle ($\kappa$) of the cutting edges of different cutting edge groups are different.

7. The circumferential milling tool according to claim 5, wherein the setting angle ($\kappa$) of the circular arc-shaped cutting edges of different cutting edge groups are different.

8. The circumferential milling tool according to claim 1, wherein the different cutting edge groups comprise different numbers of cutting edges.

9. The circumferential milling tool according to claim 1, wherein the cutting edges of at least one cutting edge group are distributed evenly around the circumference.

10. A method for arranging cutting edges on a circumferential milling tool that is rotated about a tool axis, comprising the following steps:
    arranging cutting edges of a first cutting edge group on a circular path which has a first diameter ($d_1$) and extends around the tool axis and each with a first setting angle ($\kappa_1$), so that, at a predetermined rotational speed of the circumferential milling tool and a predetermined feed rate of the circumferential milling tool, a first cutting width ($A_{e1}$) and a first tooth feed ($f_{z1}$) for the cutting edges of the first cutting edge group are set, which result in a first average chip thickness ($h_{m1}$) that is assigned to the cutting edges of the first cutting edge group,
    arranging cutting edges of a second cutting edge group on a circular path which has a second diameter ($d_2$) and extends around the tool axis and each with a second setting angle ($\kappa_2$),
    arranging cutting edges of a third cutting edge group on a circular path which has a third diameter ($d_3$) and extends around the tool axis and each with a third setting angle ($\kappa_3$), and
    wherein the second diameter ($d_2$) and/or the second setting angle ($\kappa_2$) are selected such that, at the predetermined rotational speed of the circumferential milling tool and the predetermined feed rate of the circumferential milling tool, a second cutting width ($A_{e2}$) and a second tooth feed ($f_{z2}$) for the cutting edges of the second cutting edge group are set, which result in a second average chip thickness ($h_{m2}$) that is assigned to the cutting edges of a second cutting edge group,
    wherein the third diameter ($d_3$) and/or the third setting angle ($\kappa_3$) are selected such that, at the predetermined rotational speed of the circumferential milling tool and the predetermined feed rate of the circumferential milling tool, a third tooth feed ($f_{z3}$) and a third cutting width ($A_{e3}$) which result from the predetermined first tooth feed ($f_{z1}$) and the predetermined first cutting width ($A_{e1}$) and which in turn result in a third average chip thickness ($h_{m3}$) that is assigned to the cutting edges of the third cutting edge group,
    wherein the first average chip thickness ($h_{m1}$) and/or the second average chip thickness ($h_{m2}$) and/or the third average chip thickness ($h_{m3}$) differ by at most 10%, and
    wherein the third diameter ($d_3$) is smaller than the first diameter ($d_1$) and the second diameter ($d_2$).

11. The method according to claim 10, wherein the first average chip thickness ($h_{m1}$) and the second average chip thickness ($h_{m2}$) are equal.

12. The method according to claim 10, wherein the different cutting edge groups comprise different numbers of cutting edges.

13. The method according to claim 10, wherein the cutting edges of at least one cutting edge group are distributed evenly around the circumference.

14. The method according to claim 10, wherein the cutting edges of the first cutting edge group are offset along the tool axis relative to the cutting edges of the second cutting edge group.

* * * * *